March 28, 1933. T. SUHARA 1,903,204
PHOTOGRAPHING DEVICE FOR HIGH SPEED MOVING PICTURES
Filed Feb. 15, 1928
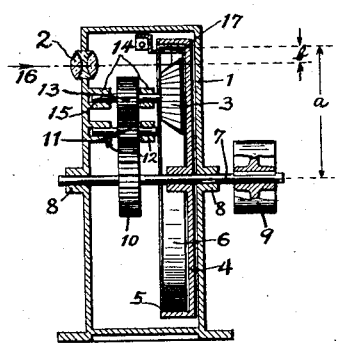
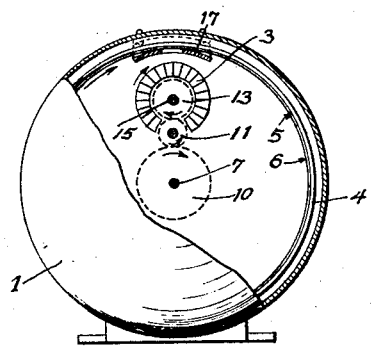
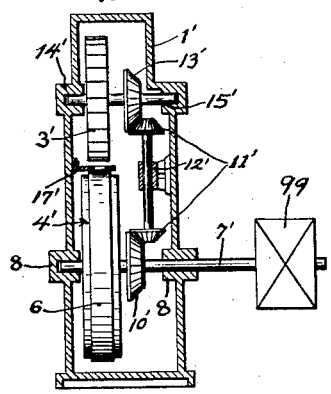
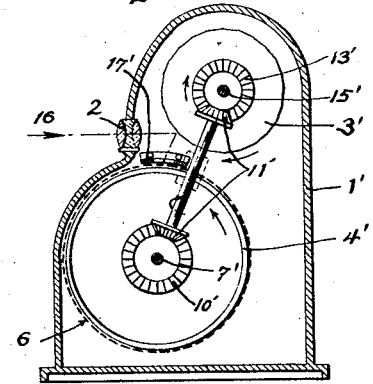
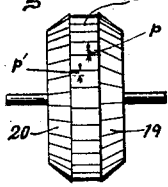
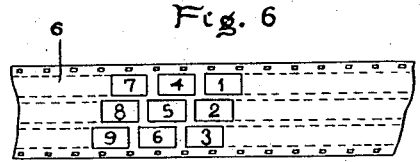
Inventor
Joyotaro Suhara
by Marks & Clerk
His Attorneys.

Patented Mar. 28, 1933

1,903,204

UNITED STATES PATENT OFFICE

TOYOTARO SUHARA, OF TOKYO, JAPAN

PHOTOGRAPHING DEVICE FOR HIGH SPEED MOVING PICTURES

Application filed February 15, 1928, Serial No. 254,532, and in Japan March 8, 1927.

My invention relates to an extra high speed moving picture photographing device, and more particularly to a moving picture camera which is adapted to take photographs at the rate of more than one hundred thousand repetitions per second for disclosing easily and clearly the rapidly varying phenomena or moving bodies, such for instance, as the high speed air current, the motion of sound waves in the air and the motion of fired or projected shot and the like. The object of my invention is to provide a superior motion picture photographing device which enables taking photographs at extremely high speed which has never been attained before, such for instance as photographing for showing a body proceeding at a rapid speed or quickly changing phenomena easily and clearly, since according to my invention the speed of the film can be made comparatively low effectively.

In heretofore known so-called high speed moving picture cameras it is usual to obtain a photographing speed of two or three hundred repetitions per second and there is one which enables taking pictures at the rate of three or four thousand times per second with a special lens or prism, and it is stated that the exposure of about ten thousand times per second might be possible by taking advantage of the light source of a spark produced by special electric oscillations, but it requires various complicated arrangements to start the spark with high speed repetitions, yet it can only produce a very weak and inaccurate source and accordingly no practicable moving picture cameras which can produce continuously pictures with at least a hundred thousand repetitions per second have been realized yet and there is nothing which can attain the object of taking pictures of various moving phenomena which I have been requiring.

According to my invention the above described defect is obviated and I have successfully constructed a device which enables taking pictures at unusually high speed which has never been attained and I have obtained a very clear picture as the result of actual tests by photographing various phenomena, for example, when a vacuum glass globe is exploded by bursting it or the phenomena of air current when it is cut by propeller blades revolving at several thousand revolutions per minute, or the motion of a bullet piercing an obstacle, with the photographing speed above fifty thousand repetitions per second easily.

My invention will be better understood from the following description taken in connection with the accompanying drawing and its scope will be pointed out in the appended claims.

Referring to the drawing, Fig. 1 is a sectional side elevation of extra high speed moving picture camera embodying my invention; Fig. 2 is a fragmentary sectional front elevation; Fig. 3 is a sectional elevation illustrating another embodiment of my invention when a polygonal cylindrical reflecting mirror is used; Fig. 4 is its sectional side elevation; Fig. 5 is a side view of a reflecting mirror consisting of a combination of two sets of truncated polygonal pyramids and a polygonal cylinder in order to obtain a far higher speed camera and Fig. 6 indicates a part of the developed film obtained by said mirror. Like reference numerals indicate corresponding parts in the different figures of the drawing.

Now reference is taken to the accompanying drawing for a better understanding of my invention, and in an embodiment of my invention shown in Figs. 1 and 2, 1 indicates a camera, 2 is a lens mounted in a suitable position on the front side of the casing, 3 is a special revolving reflecting mirror according to my invention and the film is arranged to rotate with uniform speed around the eccentric axis parallel to the axis of said mirror. The reflecting mirror 3, as shown in Fig. 1, is the kind of reflecting mirror which uses the external surfaces of a truncated polygonal pyramid consisting of a group of a number of planes and the axis of the pyramid is taken parallel or almost parallel to the axis of a circular disc and is located at the eccentric position and the film 6 is extended and secured along the inner periphery 5 of the circular disc 4 and is arranged to face opposite to the reflecting mirror and in such relative position that the image from the lens 2 comes on the film. The circular disc 4 which holds the endless film dovetailed thereto or pasted thereon is supported by suitable bearings 8 on the side wall of the camera 1 and arranged to be driven from a suitable power source such for instance as an electric motor or by means of the belt pulley 9 so as to feed or advance the film 6 with necessary speed. The revolution of the main shaft 7 is transmitted to the reflecting mirror 3 through a suitable power transmitting means such as the toothed gearing 10, 11 and 13 so as to drive it continuously in the same direction as the film with the required speed. 12 and 14 indicate bearings for supporting the shaft of intermediate gear wheel 11 and the shaft 15 of the reflecting mirror respectively, 17 being a slit for limiting the range of projecting light. The slit 17 is preferably mounted adjustably to the wall of the casing for limiting the range of the image projected on the film 6 from a reflecting surface of the polygonal pyramidal reflecting mirror 3 so as to prevent the breaking of the image owing to the deviation of linear speed of the film 6 from the linear speed of the reflected image.

Now I will explain a modified form of my invention shown in Figs. 3 and 4. In these figures, 1' represents a camera, 2 is a photographing lens, 3' is a reflecting mirror which is in this case a polygonal cylinder or a regular polyhedral cylindrical body. 4' is a circular disc, on the external periphery of which the film 6 is mounted as described above and is rotated at a required speed similarly to that already described. 7' is a driving shaft of the disc 4', and 8 indicates its bearing. The shaft 15 of the reflecting mirror is rotated at a required ratio from the driving shaft 7' through a suitable gearing, such for instance, as bevel wheels 10', 11' and 13'. 12' and 14' indicate the bearings for the shaft of the bevel wheel 11' and the shaft of the reflecting mirror respectively. 99 is a power source such as an electric motor and the like, similarly to that already described, 17 is an adjustable frame provided with a slit.

In either of the foregoing examples, the power transmitting mechanism should be so selected that the speed of the advancing film and the revolving speed of the reflecting mirror might have the following relation. According to my invention, I have arranged the gearing in such a relation that the speed of the advancing image formed on the film 6 by the light source 16 which passes through the lens 2 and is reflected by one face of the reflecting mirror 3' is made equal to the advancing speed of the mirror and accordingly the image always occupies the same relative positions on the film giving the same results as if the image is projected on a stationary film, thereby producing clear pictures continuously and it obviates the use of any shutter so that the various disadvantages accompanying the use of a shutter can be avoided. The film need not be stopped every time the shutter is opened or closed, but on the contrary the film can be advanced continuously with a certain uniform speed so that it is most suitable for extra high speed photographs.

Now I will explain an example referring to the apparatus shown in Fig. 1.

Let W be the angular velocity of the circular disc 4 or the angular velocity of the main shaft 7.

W' be the angular velocity of the reflecting mirror 3.

$a$ be the distance from the centre line of the main shaft to the surface of the film 6.

$b$ be the distance between the point where the centre line 16 of the projecting light intersects the surface of the reflecting mirror 3 and the surface of the film 6, then if the distances $a$, $b$ and the number of teeth of the gear wheels 10, 11 and 13 were so selected that $$W'' : W = a : b$$

the image formed on the film 6 should proceed with the same speed as the film for a certain range so that the image might always be stationary on the film irrespective of the speed of the revolving disc 4 or that of the film and they are in a stationary condition relatively so that clear pictures can be taken continuously.

As it is evident from the foregoing, according to the device embodying my invention, each of the reflecting surfaces of the polygonal pyramid or polygonal cylinder will rotate with the film in the same direction while projecting each image successively on the film and meanwhile as the range of image is limited by the slit 17, the picture in each section can be developed on the film successively. The projecting or photographing speed can be expressed by the number equal to the product of the revolving speed of the reflecting mirror and the number of its reflecting surfaces so that the photographing of several hundred thousand times per second can be realized and thus it will be evident that a device which is suitable for the highest speed photographing can be obtained by the selection of the arrangement as described above.

In Fig. 5, I have shown a composite type reflecting mirror built up for taking photographs at far higher speed in carrying out my invention in one way. The compound mirror consists of a combination of a set of polygonal cylindrical reflecting mirror 18 and two sets of polygonal pyramidal reflecting mirrors 19 and 20, each associated to one side of the former mirror 18 with a small phase difference, all of these mirrors having the same number of reflecting surfaces which are assembled together with the necessary phase differences P and P' between them. By using such compound reflecting mirror three rows of pictures having a small phase difference can be obtained as shown in Fig. 6 and such series of pictures may be developed in the order of 1, 2, 3, 4, 5 . . . shown and accordingly with this device the picture can be taken at a speed three times of that of Figs. 1 and 4. If the former is operable for fifty thousand times per second then pictures of one hundred fifty thousand times per second can be taken by this compound reflecting mirror.

The reflector of Fig. 5 may be simply substituted for the reflector 3 of Fig. 4 for use with a single film and the same lens. As the operating surfaces of reflectors 19 and 20 on opposite sides of the reflector 18 have only a small angle of inclination actually, no practical troubles occur and the pictures as shown in Fig. 6 can be taken with this compound reflector combined with a single slit 17. It will be seen that each of the reflecting surfaces 19, 18 and 20 are successively shifted so that the images such as 1, 2 and 3 of Fig. 6 can be successively focused on the film since the images or light not focused on the film will be interrupted by the edge of the slit 17 and will not act on the film.

What I claim as new and desire to secure by Letters Patent of the United States, is:

1. A high speed moving picture photographing device comprising a composite reflecting mirror which is made by associating a truncated polygonal pyramid to opposite sides of a polygonal prism with a suitable phase difference between adjacent reflecting surfaces, a cylindrical disc secured on a shaft which is parallel to the axis of said reflecting mirror having a film secured around its outer periphery and arranged opposite said reflecting mirror, a lens arranged on a straight line in the plane substantially normal to the revolving shaft of said reflecting mirror and in such relation that the light projected therethrough onto said mirror can focus on the film to produce a plurality of rows of successive images with a certain phase difference, a power transmission mechanism for continuously rotating said reflecting mirror and film at the same relative speed in the same direction, an adjustable slit arranged outside of said film and between it and the reflecting mirror, and a prime mover for operating said power transmitting mechanism.

2. A high speed moving picture photographing device comprising a revolving mirror composed of successively angled reflecting surfaces of a truncated convex polygonal body, a disc mounted on a revolving shaft which is parallel to the revolving axis of said mirror for attaching the film around its periphery in such a manner that said film is made to cooperate with the successive reflecting surfaces of said mirror, a lens secured to the camera in such relative position that the light projected therethrough onto said mirror focuses on the film, and means for driving said mirror and said film carrying disc in substantially such direction and at the same peripheral speed that there is no relative speed between the film and the images focused thereon.

3. A high speed moving picture photographing device comprising a camera, a circular disc or frame rotatably mounted on said camera adapted for holding a film around the outer periphery of said disc or frame, a regular, polygonal prismatic reflecting mirror to be rotated by a shaft parallel to the driving shaft of said disc or frame, a lens secured to the camera casing in such relation that the light projected therethrough onto said mirror is focused on said film, an adjustable slit arranged between said film and the reflecting mirror to limit the range of projecting light, and means for rotating said disc or frame and said mirror at the same peripheral speed so that the film can proceed in substantially the same direction with zero relative speeds.

4. A high speed moving picture photographing device comprising a camera, a circular disc rotatably mounted in said camera adapted to have a film secured around its periphery, a regular truncated polygonal pyramidal reflecting mirror arranged in said camera to rotate on an axis parallel to that of said circular disc and located eccentrically thereto, a lens secured to the camera to focus the image of an object reflected by said reflecting mirror on the film, a transmission mechanism for rotating said reflecting mirror in the same direction as said circular disc with such relative speeds that the velocity of the image reflected by the mirror and focused on the film is exactly equal to the velocity of the film on the periphery of the circular disc and an adjustable slit arranged between the film attaching periphery of said circular disc and the reflecting mirror.

In testimony whereof I have affixed my signature.

TOYOTARO SUHARA.